US007419730B2

(12) United States Patent
Bian et al.

(10) Patent No.: US 7,419,730 B2
(45) Date of Patent: Sep. 2, 2008

(54) MAGNETIC RECORDING DISK WITH ANTIFERROMAGNETICALLY COUPLED MASTER LAYER INCLUDING COPPER

(75) Inventors: Xiaoping Bian, San Jose, CA (US); Mary Frances Doerner, Santa Cruz, CA (US); Tetsuya Kanbe, Cupertino, CA (US); Mark Mercado, Morgan Hill, CA (US); Mohammad Mirzamaani, San Jose, CA (US); Adam Polcyn, San Jose, CA (US); Kai Tang, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 379 days.

(21) Appl. No.: 10/931,642

(22) Filed: Aug. 31, 2004

(65) Prior Publication Data

US 2006/0046102 A1 Mar. 2, 2006

(51) Int. Cl.
*G11B 5/66* (2006.01)

(52) U.S. Cl. .................... 428/828.1; 428/829; 428/830; 428/836.1; 428/831; 428/831.2; 360/135

(58) Field of Classification Search ................. None
See application file for complete search history.

(56) References Cited

U.S. PATENT DOCUMENTS

| 6,280,813 | B1   |   | 8/2001  | Carey et al. |           |
|-----------|------|---|---------|--------------|-----------|
| 6,567,236 | B1   | * | 5/2003  | Doerner et al. | 360/97.01 |
| 6,623,875 | B2   |   | 9/2003  | Inomata et al. |         |
| 6,645,646 | B1   |   | 11/2003 | Umeda et al. |           |
| 6,670,057 | B2   |   | 12/2003 | Inomata |                |
| 6,682,834 | B2   |   | 1/2004  | Okuyama et al. |        |
| 6,852,430 | B2   | * | 2/2005  | Bian et al. | 428/831   |
| 6,858,331 | B1   | * | 2/2005  | Bian et al. | 428/832.2 |
| 6,939,626 | B2   | * | 9/2005  | Tang | 428/811.2        |
| 6,964,819 | B1   | * | 11/2005 | Girt et al. | 428/828   |
| 7,070,870 | B2   | * | 7/2006  | Bertero et al. | 428/828 |
| 7,074,508 | B2   | * | 7/2006  | Ajan | 428/829          |
| 2002/0160234 | A1 |   | 10/2002 | Sakawaki et al. |       |
| 2003/0008178 | A1 | * | 1/2003  | Bian et al. | 428/694 TS |
| 2003/0049461 | A1 |   | 3/2003  | Inomata |                |
| 2003/0104248 | A1 | * | 6/2003  | Tomiyasu et al. | 428/693 |
| 2003/0104253 | A1 |   | 6/2003  | Osawa et al. |          |
| 2003/0152805 | A1 |   | 8/2003  | Bertero et al. |        |
| 2003/0232218 | A1 | * | 12/2003 | Sato et al. | 428/694 T |
| 2004/0013910 | A1 |   | 1/2004  | Acharya |                |
| 2004/0265637 | A1 | * | 12/2004 | Bian et al. | 428/694 T |
| 2005/0019609 | A1 | * | 1/2005  | Tang | 428/694 TM       |
| 2005/0048328 | A1 | * | 3/2005  | Bian et al. | 428/694 TS |

FOREIGN PATENT DOCUMENTS

WO WO03083841 A1 10/2003

OTHER PUBLICATIONS

D.D.Djayaprawira, et al., "Dependence of exchange bias field on composition of stabilizing layer and sputtering process in synthetic ferrimagnetic coupled media", Journal of Magnetism and Magnetic Material, vol. 239, 2002, pp. 396-398.

* cited by examiner

*Primary Examiner*—Kevin M Bernatz
(74) *Attorney, Agent, or Firm*—G. Marlin Knight

(57) ABSTRACT

An antiferromagnetically coupled (AFC) magnetic recording medium with an AFC master layer comprising at least two magnetic layers with the top magnetic layer including copper is described. The slave layer is separated from the master layer structure by a nonmagnetic spacer layer selected to antiferromagnetically couple the layers. The master layer structure according to the invention includes a bottom and top layer of distinct ferromagnetic materials. Preferably, the top layer of the master layer is a cobalt alloy including from 1 to 5 at. % copper with an example being $CoPt_{13}Cr_{20}B_8Cu_2$. The AFC magnetic layer structure can be used with a variety of substrates including circumferentially textured glass and NiP/AlMg.

24 Claims, 2 Drawing Sheets

MAGNETIC RECORDING DISK WITH ANTIFERROMAGNETICALLY COUPLED MASTER LAYER INCLUDING COPPER

FIELD OF THE INVENTION

The invention relates to magnetic thin film media with antiferromagnetically coupled ferromagnetic layers and more particularly to materials used for the ferromagnetic thin films in such media.

BACKGROUND OF THE INVENTION

A typical prior art a disk drive system 10 using longitudinal recording is illustrated in FIG. 1. In operation the magnetic transducer (head) 20 is supported by the suspension (not shown) as it flies above the rotating disk 16. The magnetic transducer 20, usually called a "head" or "slider," is composed of elements that perform the task of writing magnetic transitions (the write head 23) and reading the magnetic transitions (the read head 12). The magnetic transducer 20 is positioned over points at varying radial distances from the center of the disk 16 to read and write circular tracks (not shown). The disk 16 is attached to a spindle (not shown) driven by a spindle motor (not shown) to rotate the disk 16. The disk 16 comprises a substrate 26 on which a plurality of thin films 21 are deposited. The thin films 21 include ferromagnetic material in which the write head 23 records the magnetic transitions in which information is encoded.

The conventional disk 16 includes substrate 26 of glass or AlMg with an electroless coating of $Ni_3P$ that has been highly polished. The thin films 21 on the disk 16 typically include a chromium or chromium alloy underlayer and at least one ferromagnetic layer based on various alloys of cobalt. For example, a commonly used alloy is CoPtCr. Additional elements such as tantalum and boron are often used in the magnetic alloy. A protective overcoat layer is used to improve wearability and corrosion resistance. Various seed layers, multiple underlayers have all been described in the prior art. More recently antiferromagnetically coupled media have been described. Seed layers have been suggested for use with nonmetallic substrate materials such as glass. Typically the seed layer is the first crystalline film deposited in the structure and is followed by the underlayer. Materials proposed for use as seed layers include chromium, titanium, tantalum, MgO, tungsten, CrTi, FeAl, NiAl and RuAl. The use of pre-seed layers 31 is relatively recent practice. The pre-seed layer is an amorphous or nanocrystalline thin film that is deposited on the substrate prior to the crystalline seed layer. The preseed layer helps to improve media magnetic properties and recording performance and provide excellent mechanical properties for the hard disk.

In U.S. Pat. No. 6,280,813 to Carey, et al. a layer structure is described that includes at least two ferromagnetic films antiferromagnetically coupled together across a nonferromagnetic coupling/spacer film. In general, it is said that the exchange coupling oscillates from ferromagnetic to antiferromagnetic with increasing coupling/spacer film thickness and that the preferred 6 Angstrom thickness of the ruthenium coupling/spacer layer was selected because it corresponds to the first antiferromagnetic peak in the oscillation for the particular thin film structure. Materials that are appropriate for use as the nonferromagnetic coupling/spacer films include ruthenium (Ru), chromium (Cr), rhodium (Rh), iridium (Ir), copper (Cu), and their alloys. Because the magnetic moments of the two antiferromagnetically coupled films are oriented antiparallel, the net remanent magnetization-thickness product ($M_r t$) of the recording layer is the difference in the $M_r t$ values of the two ferromagnetic films. This reduction in $M_r t$ is accomplished without a reduction in the thermal stability of the recording medium because the volumes of the grains in the antiferromagnetically coupled films add constructively. An embodiment of the structure includes two ferromagnetic CoPtCrB films, separated by a Ru spacer film having a thickness selected to maximize the antiferromagnetic exchange coupling between the two CoPtCrB films. The top ferromagnetic layer is designed to have a greater $M_r t$ than the bottom ferromagnetic layer, so that the net moment in zero applied magnetic field is low, but nonzero. The Carey '813 patent also states that the antiferromagnetic coupling is enhanced by a thin (5 angstroms) ferromagnetic cobalt interface layer added between the coupling/spacer layer and the top and/or bottom ferromagnetic layers. The patent mentions, but does not elaborate on the use CoCr interface layers.

In U.S. Pat. No. 6,567,236 to Doerner, et al. an antiferromagnetically coupled layer structure for magnetic recording wherein the top ferromagnetic structure is a bilayer structure including a relatively thin first sublayer of ferromagnetic material in contact with the coupling/spacer layer. The first sublayer has a higher magnetic moment than the second sublayer. The second sublayer has a lower magnetic moment and is much thicker than the first sublayer with a composition and thickness selected to provide the $M_r t$ when combined with first sublayer that is needed for the overall magnetic structure. A preferred embodiment of a layer structure according to the patent is a pre-seed layer preferably of CrTi; a seed layer preferably of RuAl; an underlayer preferably of CrTi; a bottom ferromagnetic layer preferably of CoCr; an antiferromagnetic coupling/spacer layer preferably of Ru; and a top ferromagnetic structure including: a thin first sublayer of material preferably of CoCr, CoCrB or CoPtCrB, and a thicker second sublayer of material preferably of CoPtCrB with a lower moment than the first sublayer.

SUMMARY OF THE INVENTION

One embodiment of the invention is an antiferromagnetically coupled (AFC) magnetic recording medium with an AFC master layer comprising at least two magnetic layers with the top magnetic layer including copper. The slave layer is separated from the master layer structure by a nonmagnetic spacer layer selected to antiferromagnetically couple the layers. The master layer structure according to the invention includes a bottom and top layer of distinct ferromagnetic materials. Preferably, the top layer of the master layer is a cobalt alloy including from 1 to 5 at. % copper with an example being $CoPt_{13}Cr_{20}B_8Cu_2$. In one embodiment the middle layer is $CoPt_{13}Cr_{19}B_7$, the slave layer is $CoCr_{10}$ and the spacer layer is ruthenium (Ru). The AFC magnetic layer structure according to the invention improves signal-to-noise ratio, increases media AC squeeze, increases coercivity ($H_c$), reduces side erase band and allows higher track density while maintaining good overwrite (OW). The AFC magnetic layer structure can be used with a variety of substrate including glass and NiP/AlMg.

DETAILED DESCRIPTION OF THE INVENTION AND THE PREFERRED EMBODIMENTS

Benefits of using Cu containing magnetic alloy as the top magnetic layer in an AFC structure:
1. Improve media signal-to-noise ratio.
2. Increase media AC squeeze, reducing side erase band and allowing higher track density.
3. Maintain similar OW.
4. Applicable to media on both glass and AlMg substrates.

Figure 1:
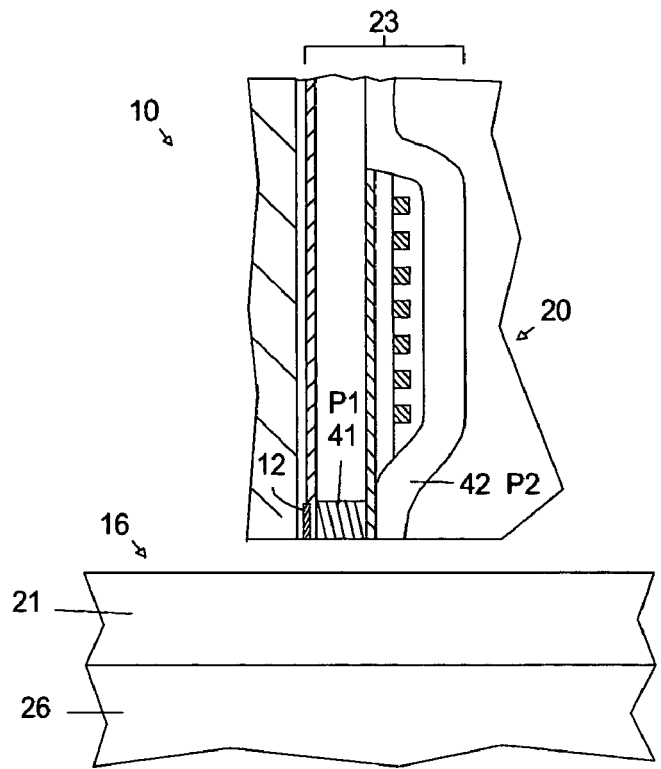
FIG. 1 is a symbolic illustration of the prior art showing the relationships between the head and associated components in a disk drive.
Figure 2:
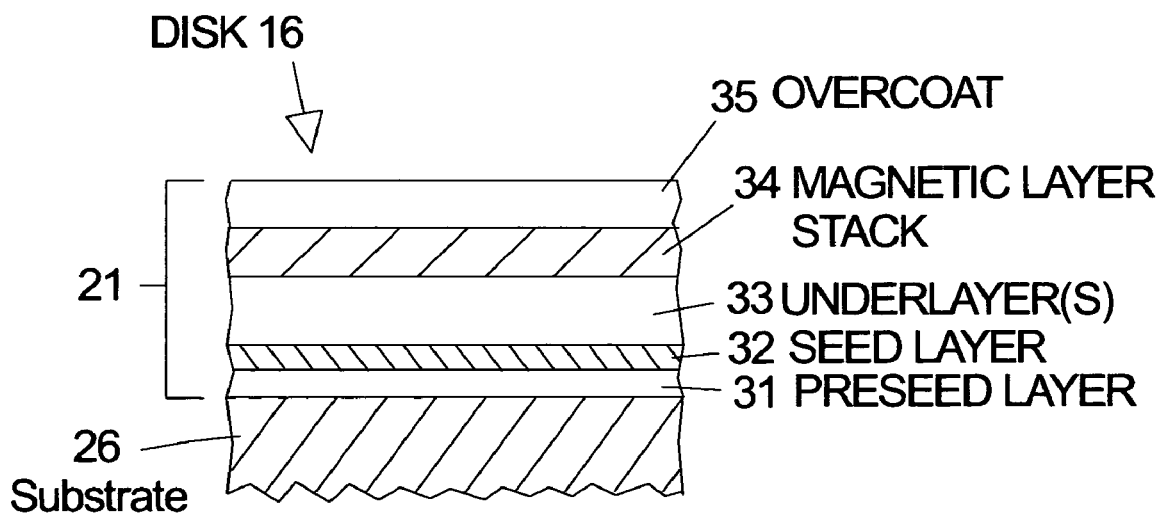
FIG. 2 is an illustration of a prior art layer structure for a magnetic thin film disk with which the antiferromagnetically coupled magnetic layer stack of the invention can be used.

FIG. 2 illustrates a prior art layer structure 21 of a thin film magnetic disk 16 in which the layer stack according to the invention can be used. The layers under the underlayer 33 may be any of several combinations of seed layers 32 and pre-seed layers 31 as noted in more detail below. The layer structure shown in FIG. 2 can be used with a variety of magnetic layer stacks.

Figure 3:
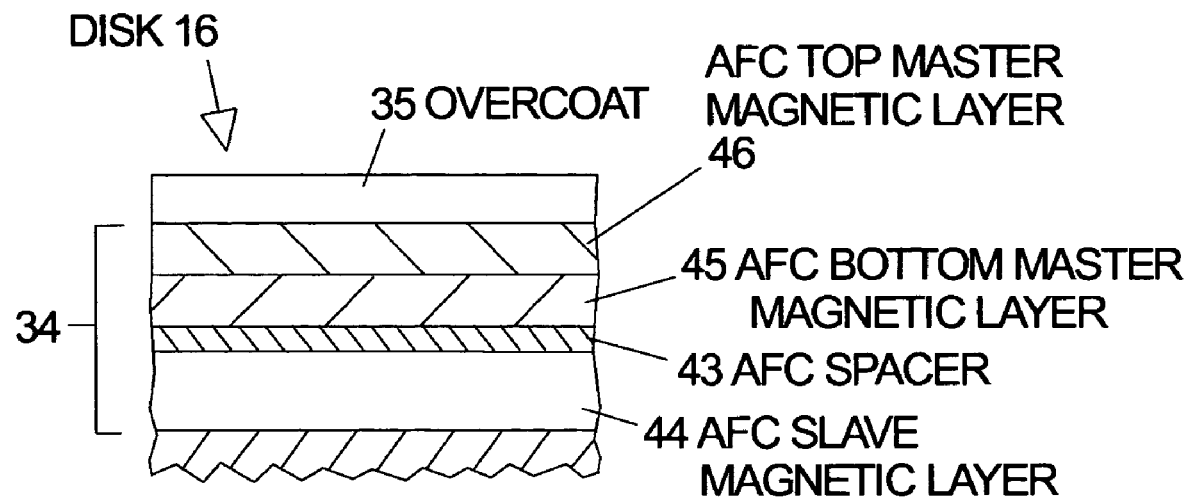
FIG. 3 is an illustration of an antiferromagnetically coupled magnetic layer stack for a prior art magnetic thin film disk in which the magnetic alloy according to the invention can be used.

The magnetic layer stack 34 is composed of a plurality of layers which are further illustrated in FIG. 3. An embodiment of a layer stack 34 according to the invention is an antiferromagnetically coupled structure including a master layer structure which has a top master magnetic layer 46 (the magnetic layer nearest the head) and a bottom master magnetic layer 45. The AFC spacer layer 43 separates the master layer structure from the slave magnetic layer 44. The top layer 46 and bottom layer 45 act together as the master layer in the antiferromagnetically coupled structure. The top layer preferably contains from 1 to 5 at. % copper according to the invention. A variety of cobalt alloys have been used in the prior art for the master layer and can include copper according to the invention. Along with copper the preferred composition includes cobalt, platinum and chromium and the most preferred composition is CoPtCrBCu with 10-26 at. % chromium, 11-18 at. % platinum, 4-18 at. % boron and 1-5 at. % copper.

The slave magnetic layer 44 is a ferromagnetic material of the type used in the prior art of thin film disks. The invention can be used with a variety of slave layer compositions. Examples of materials suitable for slave magnetic layer 44 include CoCr, CoCrZr, CoPtCr and CoPtCrB.

The AFC spacer layer 43 is a nonmagnetic material with a thickness that is selected to antiferromagnetically couple the top and middle magnetic layers 45, 46 with the slave magnetic layer 44. Ruthenium is the preferred material for the coupling/spacer layer 43, but the prior art indicates that suitable materials include chromium (Cr), rhodium (Rh), iridium (Ir), copper (Cu), and their alloys. The thickness of the spacer layer 43 is according to the prior art; for example, approximately 6 Angstroms is a preferred target thickness for a ruthenium coupling/spacer layer 43.

Embodiments of the invention for use on circumferentially textured NiP/AlMg and glass substrates will be described. The bilayer AFC master layer is useful for optimizing the recording performance of the media. The addition of copper to the AFC top master magnetic layer is useful in this broader context. Since NiP/AlMg substrates are electrically conductive, a bias voltage can relatively easily be applied during the deposition of the thin films. This allows a lower moment magnetic material to be used as the AFC bottom master magnetic layer in the bilayer master layer and a high moment material to be used as the top layer which has certain advantages known in the prior art. Since glass substrates are not electrically conductive, it is more difficult to apply bias during thin film deposition. As a result it becomes more difficult to deposit the lower moment magnetic materials with good in-plane c-axis characteristics as the bottom layer in the bilayer master layer on glass substrates.

Table 1 gives the layer structure for two disks with circumferentially textured glass substrates which are the same except for the addition of copper to the AFC top master magnetic layer 46 according to the invention. The layer structure is as illustrated in FIGS. 2 and 3. The bilayer master layer in these disks is designed to have a bottom layer with a higher moment. The magnetic material is selected to be deposited without bias voltage and to have good in-plane c-axis with narrow dispersion. The top layer is selected with a lower magnetic moment with superior SNR.

TABLE 1

| Case #1 Layer Structure On Textured Glass Substrate | |
| --- | --- |
| $CoPt_{13}Cr_{17}B_{12}$ | $CoPt_{13}Cr_{20}B_8Cu_2$. |
| $CoPt_{13}Cr_{19}B_7$ | $CoPt_{13}Cr_{19}B_7$ |
| Ru | Ru |
| $CoCr_{10}$ | $CoCr_{10}$ |
| $CrTi_{20}$ | $CrTi_{20}$ |
| RuAl | RuAl |
| $CrTi_{50}$ | $CrTi_{50}$ |
| Textured Glass Substrate | Textured Glass Substrate |

Table 2 compares the recording performance of the experimental disks according to Table 1 to isolate differences resulting from a change resulting from adding copper to the top magnetic layer. Each of the disks has a pre-seed layer of $CrTi_{50}$ and a seed layer of $RuAl_{50}$. The RuAl has a B2 crystallographic structure. The pre-seed layer can also be CrTa or AlTi. The pre-seed layer is amorphous or nanocrystalline. Various crystalline underlayers such as $CrTi_{20}$ or $CrMo_{20}$ can be used with the invention. The high frequency $S_0NR$ ($1TS_0NR$) is measured at the maximum recording density. The mid-frequency $S_0NR$ ($2TS_0NR$) is measured at half of the maximum recording density.

TABLE 2

| | | Textured Glass Substrate Results. Case #1 | | | | | |
| --- | --- | --- | --- | --- | --- | --- | --- |
| | $H_c$ (kOe) | $M_r t$ (memu/ $cm^2$) | DCSNR (dB) | $2TS_0NR^1$ (dB) | $1TS_0NR^2$ (dB) | ACsqz (%) | OW (dB) |
| The invention | 4.16 | 0.38 | 32.0 | 28.5 | 25.5 | 64.1 | 28.9 |
| Control Disk | 4.02 | 0.38 | 32.0 | 28.3 | 25.2 | 55.3 | 29.1 |

[1]$2TS_0NR$: $S_0NR$ at half of the maximum density.
[2]$1TS_0NR$: $S_0NR$ at the maximum density.

In a second experiment disks were prepared with the layer structure shown in Table 3. Each disk has an antiferromagnetically coupled master and slave layer and a circumferentially-textured NiP/AlMg substrate. The bilayer master layer in these disks is designed to have a bottom layer with a lower moment. The magnetic material is selected to be deposited with bias voltage. The top layer is selected with a higher magnetic moment to optimize the PW50 and resolution.

Table 4 compares the recording performance of the experimental disks according to Table 3 to isolate differences resulting from a change resulting from adding copper to the top magnetic layer of the master layer according to the invention. The slave magnetic layer in each disk is $CoCr_{20}Zr_5$. Although the invention does not limit the slave layer composition, one embodiment uses CoCrZr with 2-6 at. % Zr. Each of the disks has multiple underlayers of Cr, CrMoB and CrMo Various crystalline underlayers can be used with the invention.

TABLE 3

Case #2 Layer Structure On NiP/AlMg substrate

| | |
|---|---|
| $CoPt_{13}Cr_{11}B_{15}$ | $CoPt_{12}Cr_{11}B_{15}Cu_2$. |
| $CoPt_{13}Cr_{25}B_6$ | $CoPt_{13}Cr_{25}B_6$ |
| Ru | Ru |
| $CoCr_{20}Zr_5$ | $CoCr_{20}Zr_5$ |
| $CrMo_{20}$ | $CrMo_{20}$ |
| $Cr Mo_{15}B_5$ | $Cr Mo_{15}B_5$ |
| Cr | Cr |
| Textured NiP/AlMg | Textured NiP/AlMg |
| Substrate | Substrate |

Table 4 compares the magnetic layer stack of the invention with the control disk on a circumferentially-textured NiP/AlMg substrate.

TABLE 4

Textured NiP/AlMg Substrate Results. Case #2

| | $H_c$ (kOe) | $M_r t$ (memu/ $cm^2$) | DCSNR (dB) | $2TS_0NR^1$ (dB) | $1TS_0NR^2$ (dB) | ACsqz (%) | OW (dB) |
|---|---|---|---|---|---|---|---|
| This invention | 4.08 | 0.41 | 32.3 | 27.9 | 24.7 | 55.6 | 34.0 |
| Control Disk | 4.11 | 0.43 | 32.1 | 27.6 | 24.2 | 50 | 33.9 |

$1TS_0NR$: $S_0NR$ at the maximum density.
$2TS_0NR$: $S_0NR$ at half of the maximum density.

If bias voltage can be applied during deposition of the thin films on a non-metallic substrate such as glass, the magnetic layer stacks described in Table 3 can be used for non-metallic substrates as well.

The thin film structures described above can be formed using standard thin film deposition techniques. The films can be sequentially sputter-deposited with each film being deposited on the previous film. The atomic percent compositions given above are given without regard for the small amounts of contamination that invariably exist in sputtered thin films as is well known to those skilled in the art. The invention has been described with respect to particular embodiments, but other uses and applications for the ferromagnetic structure according to the invention will be apparent to those skilled in the art.

The invention claimed is:

1. A thin film magnetic recording medium comprising:
an amorphous or nanocrystalline pre-seed layer;
a seed layer deposited after the pre-seed layer;
at least one underlayer deposited after the seed layer;
a slave ferromagnetic layer consisting of CoCrZr deposited on the underlayer;
a nonmagnetic spacer layer adjacent to the slave ferromagnetic layer; and
a master layer structure including:
a bottom layer of ferromagnetic material adjacent to the spacer layer; and
a top layer of ferromagnetic material adjacent to the bottom layer, the bottom and top layers of ferromagnetic material being antiferromagnetically coupled to the slave ferromagnetic layer, the top layer being an alloy including cobalt, platinum, chromium and copper.

2. The thin film magnetic recording medium of claim 1 wherein the top layer of ferromagnetic material has from 1 to 5 at. % copper (Cu).

3. The thin film magnetic recording medium of claim 1 wherein the top layer of ferromagnetic material includes boron.

4. The thin film magnetic recording medium of claim 1 wherein the bottom layer of ferromagnetic material comprises CoPtCrB.

5. The thin film magnetic recording medium of claim 1 further comprising a circumferentially textured glass substrate and wherein the top layer of ferromagnetic material has a lower magnetic moment than the bottom layer of ferromagnetic material.

6. The thin film magnetic recording medium of claim 1 wherein the seed layer consists of RuAl.

7. The thin film magnetic recording medium of claim 1 wherein the pre-seed layer consists of CrTi or AlTi.

8. The thin film magnetic recording medium of claim 1 further comprising a circumferentially textured NiP/AlMg substrate and wherein the top layer of ferromagnetic material has a higher magnetic moment than the bottom layer of ferromagnetic material.

9. The thin film magnetic recording medium of claim 8 including one or more underlayers consisting of Cr, CrMo or CrMoB.

10. The thin film magnetic recording medium of claim 1 wherein the top layer of ferromagnetic material is approximately 13 at. % platinum, 20 at. % chromium, 8 at. % boron and 2 at. % copper.

11. A thin film magnetic recording medium comprising:
a circumferentially textured NiP/AlMg substrate;
an amorphous or nanocrystalline pre-seed layer consisting of CrTi or AlTi;
a seed layer deposited after the pre-seed layer;
at least one underlayer deposited after the seed layer;
a slave ferromagnetic layer deposited on the underlayer, the slave ferromagnetic layer consisting of CoCrZr;
a nonmagnetic spacer layer adjacent to the slave ferromagnetic layer; and
a master layer structure including:
a bottom layer of ferromagnetic material adjacent to the spacer layer; and
a top layer of ferromagnetic material adjacent to the bottom layer, the bottom and top layers of ferromagnetic material being antiferromagnetically coupled to the slave ferromagnetic layer, the top layer being an alloy including cobalt, platinum, chromium and copper, and wherein the top layer of ferromagnetic material has a higher magnetic moment than the bottom layer of ferromagnetic material.

12. A disk drive comprising:
a magnetic transducer including a read and a write head for reading and writing data on a thin film disk; and
a thin film magnetic recording medium on the thin film disk comprising:
an amorphous or nanocrystalline pre-seed layer;
a seed layer deposited after the pre-seed layer;
at least one underlayer deposited after the seed layer;
a slave ferromagnetic layer consisting of CoCrZr deposited on the underlayer;

a nonmagnetic spacer layer adjacent to the slave ferromagnetic layer; and a master layer structure including:

a bottom layer of ferromagnetic material adjacent to the spacer layer; and a top layer of ferromagnetic material adjacent to the bottom layer, the bottom and top layers of ferromagnetic material being antiferromagnetically coupled to the slave ferromagnetic layer, the top layer being an alloy including cobalt, platinum, chromium and copper.

13. The disk drive of claim 12 wherein the top layer of ferromagnetic material has from 1 to 5 at. % copper (Cu).

14. The disk drive of claim 12 wherein the top layer of ferromagnetic material includes boron.

15. The disk drive of claim 12 wherein the bottom layer of ferromagnetic material comprises CoPtCrB.

16. The disk drive of claim 12 wherein the thin film disk further comprises a circumferentially textured glass substrate and wherein the top layer of ferromagnetic material has a lower magnetic moment than the bottom layer of ferromagnetic material.

17. The disk drive of claim 16 wherein the pre-seed layer consists of CrTi or AlTi.

18. The disk drive of claim 12 wherein the seed layer consists of RuAl.

19. The disk drive claim 12 wherein the thin film magnetic recording medium further comprises a circumferentially textured NiP/AlMg substrate and wherein the top layer of ferromagnetic material has a higher magnetic moment than the bottom layer of ferromagnetic material.

20. The disk drive of claim 19 wherein the thin film magnetic recording medium includes one or more underlayers consisting of Cr, CrMo or CrMoB.

21. The disk drive of claim 12 wherein the top layer of ferromagnetic material is approximately 13 at. % platinum, 20 at. % chromium, 8 at. % boron and 2 at. % copper.

22. A disk drive comprising:

a magnetic transducer including a read and a write head for reading and writing data on a thin film disk; and a thin film magnetic recording medium on the thin film disk comprising:

a circumferentially textured NiP/AlMg a substrate;

an amorphous or nanocrystalline pre-seed layer consisting of CrTi or AlTi;

a seed layer deposited after the pre-seed layer;

at least one underlayer deposited after the seed layer;

a slave ferromagnetic layer deposited on the underlayer, the slave ferromagnetic layer consisting of CoCrZr;

a nonmagnetic spacer layer adjacent to the slave ferromagnetic layer; and a master layer structure including:

a bottom layer of ferromagnetic material adjacent to the spacer layer; and a top layer of ferromagnetic material adjacent to the bottom layer, the bottom and top layers of ferromagnetic material being antiferromagnetically coupled to the slave ferromagnetic layer, the top layer being an alloy including cobalt, platinum, chromium and copper, wherein the top layer of ferromagnetic material has a higher magnetic moment than the bottom layer of ferromagnetic material, and wherein the top layer of ferromagnetic material has a higher magnetic moment than the bottom layer of ferromagnetic material.

23. A method of fabricating a thin film magnetic recording medium comprising:

depositing an amorphous or nanocrystalline pre-seed layer;

depositing a seed layer of RuAl after the pre-seed layer;

depositing at least one thin film underlayer after the seed layer;

depositing a slave ferromagnetic layer consisting of CoCrZr on the underlayer;

depositing a nonmagnetic spacer layer on the slave ferromagnetic layer;

depositing a bottom layer of ferromagnetic material on the spacer layer; and depositing a top layer of ferromagnetic material on the bottom layer, the bottom and top layers of ferromagnetic material being antiferromagnetically coupled to the slave ferromagnetic layer, the top layer being an alloy including cobalt, platinum, chromium and copper.

24. The method of claim 23 wherein the top layer of ferromagnetic material is approximately 13 at. % platinum, 20 at. % chromium, 8 at. % boron and 2 at. % copper.

* * * * *